Figure 1:
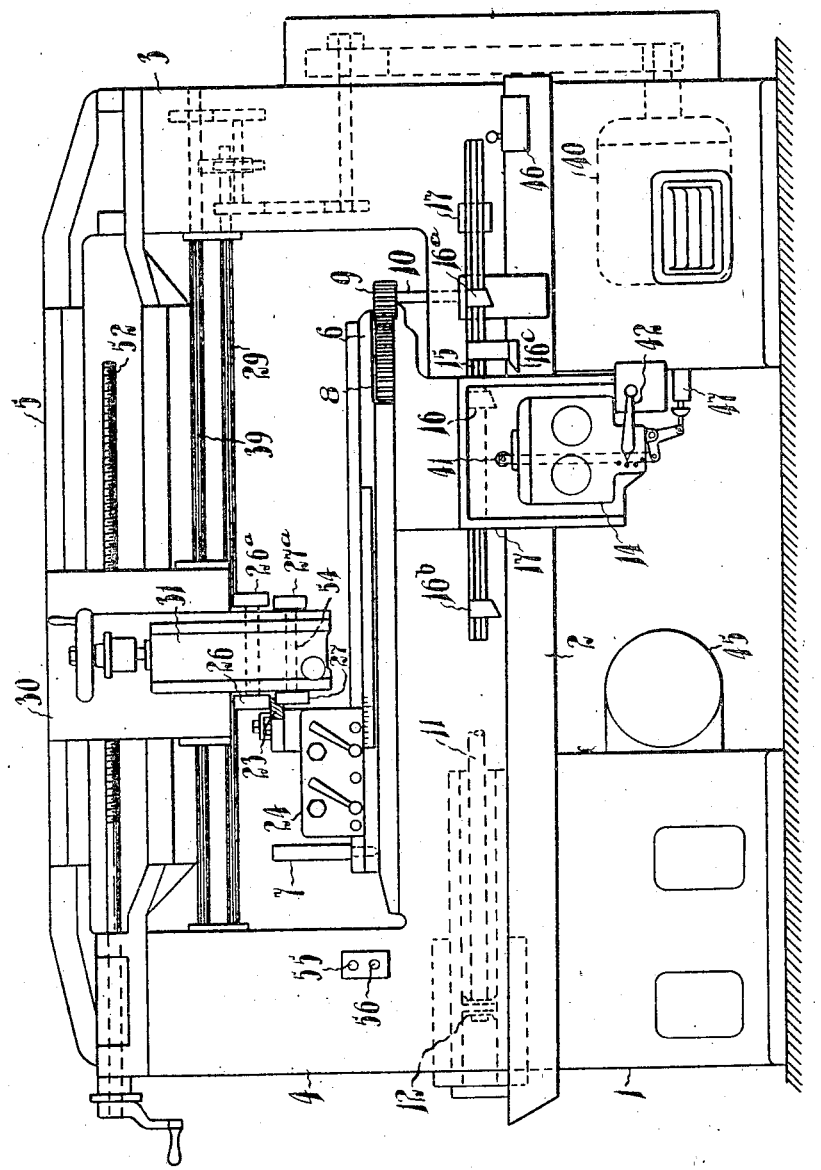

Dec. 14, 1948.  E. BARKER  2,456,041
MACHINE FOR MACHINING ARCUATE SURFACES
Original Filed Nov. 5, 1942  3 Sheets-Sheet 1

Dec. 14, 1948. E. BARKER 2,456,041
MACHINE FOR MACHINING ARCUATE SURFACES
Original Filed Nov. 5, 1942 3 Sheets-Sheet 2
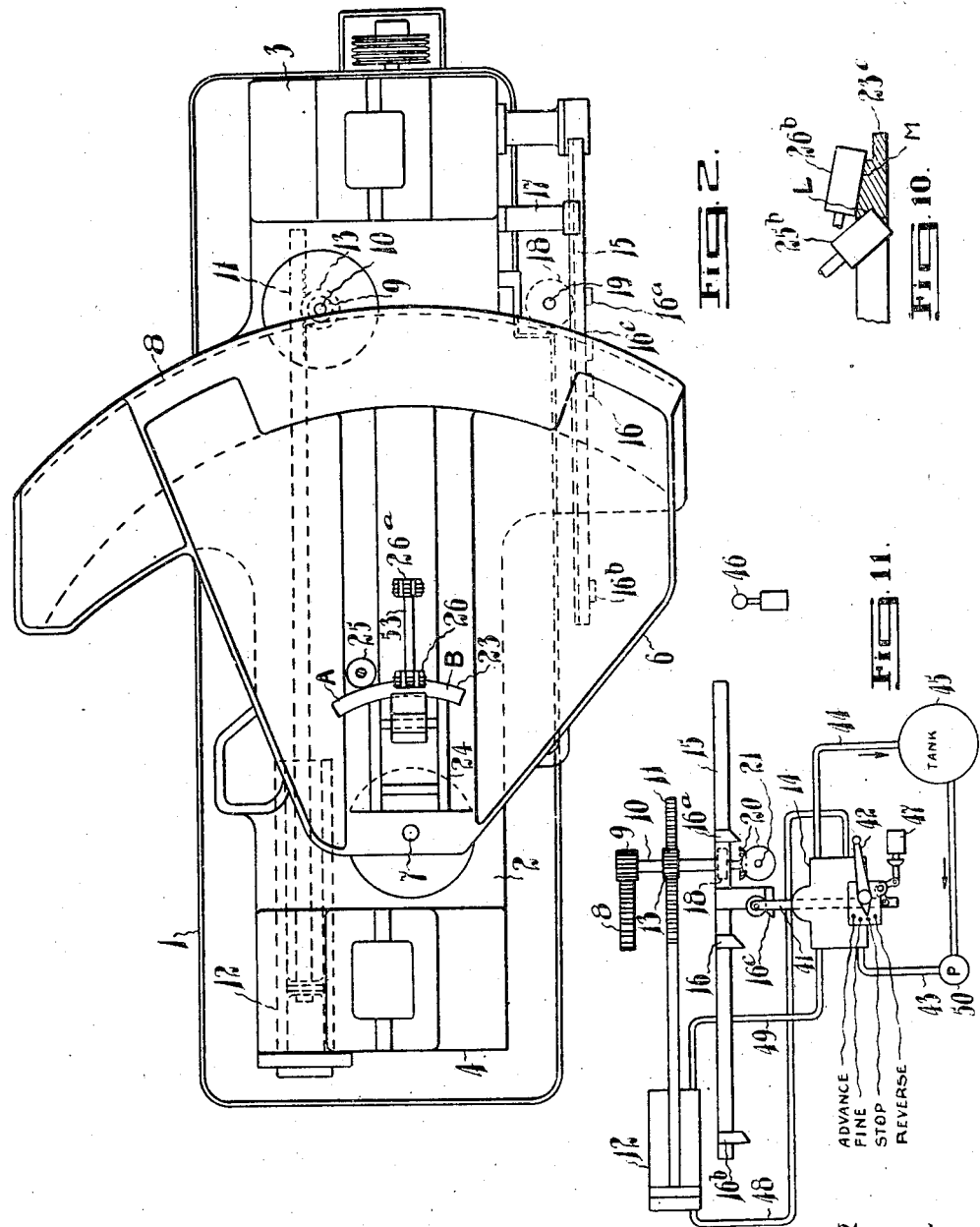

Dec. 14, 1948.   E. BARKER   2,456,041
MACHINE FOR MACHINING ARCUATE SURFACES
Original Filed Nov. 5, 1942   3 Sheets-Sheet 3
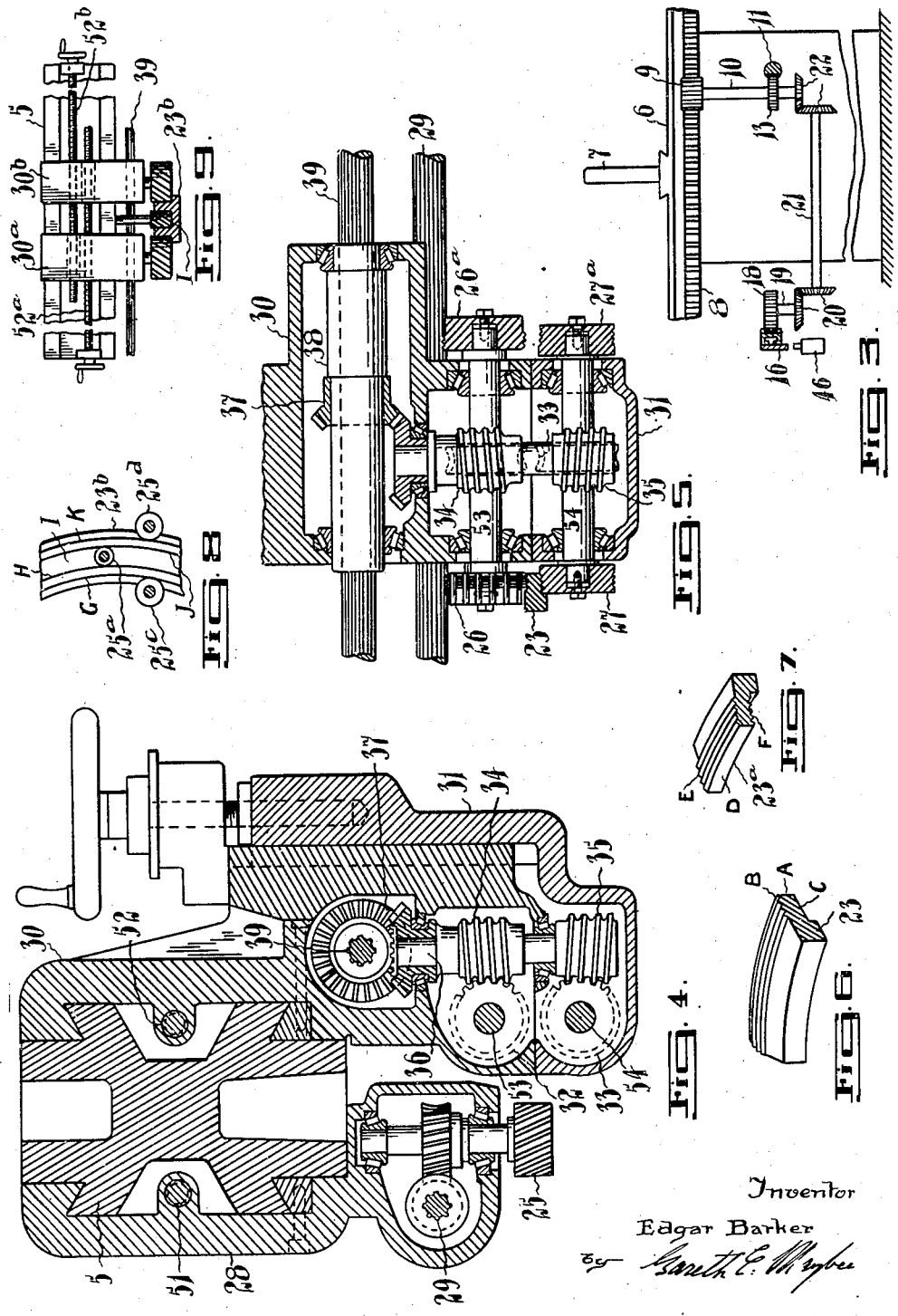
Inventor
Edgar Barker
ATTY.

Patented Dec. 14, 1948

2,456,041

UNITED STATES PATENT OFFICE 2,456,041

MACHINE FOR MACHINING ARCUATE SURFACES

Edgar Barker, Toronto, Ontario, Canada

Original application November 5, 1942, Serial No. 464,615, now Patent No. 2,379,870, dated July 10, 1945. Divided and this application January 13, 1945, Serial No. 572,665

4 Claims. (Cl. 90—16)

This application is a division of application No. 464,615, filed November 5, 1942, Patent No. 2,379,870, issued July 10, 1945.

This invention relates to machines for machining arcuate surfaces and more particularly to milling machines and my object is to devise a simple machine for cutting any desired radius within a predetermined range, without using any special forms for conveying the work to the cutters. A further object is to provide apparatus for automatically controlling the machine so that the operations will be effected in a minimum of time.

The invention is hereinafter more fully described and is illustrated, by way of example, in the accompanying drawings in which Figure 1 is a front view of a milling machine, partly broken away, and partly in section, embodying my invention;

Figure 2 a plan view of the table and bed of the machine, with the overarm removed;

Figure 3 a diagrammatical view transversely of the machine showing the mechanism for driving the table and the timing bar;

Figure 4 a cross-section of the overarm and cutter heads, on an enlarged scale;

Figure 5 a longitudinal sectional detail of the drive for the horizontal cutters;

Figure 6 a perspective view of one piece of work;

Figure 7 a perspective view of another piece of work;

Figure 8 a detail in plan of a different piece of work and a modified arrangement of cutters;

Figure 9 a cross-sectional detail of the work in Figure 8;

Figure 10 a diagrammatic view of a further piece of work showing the cutters arranged off the vertical and horizontal positions shown in Figures 4 and 5; and Figure 11 a diagrammatic view of the feed control panel.

In the drawings like numerals of reference indicate the corresponding parts in the different figures.

1 is the frame of the machine which includes a bed 2, stanchions 3 and 4 at opposite ends of the bed, and an overarm 5 suitably supported by the stanchions. A horizontal table 6 is pivoted at 7 and is suitably supported on the bed 2 for oscillation thereon. The periphery of the table has rack teeth 8 which mesh with a pinion 9 on a vertical shaft 10 which is rotated by means of a piston rod 11 connected with a piston in a hydraulic cylinder 12. The piston rod 11 has rack teeth which mesh with a second pinion 13 on the shaft 10 so that by varying the rate of flow of fluid to the cylinder, the speed of the piston rod and thus of the table 6 will be varied.

The rate of speed of the table in either direction of rotation is controlled by any suitable feed control mechanism 14 which causes fluid to be alternately directed into opposite ends of the cylinder 12, the end opposite that being supplied with fluid to be drained, and the rate of flow of the fluid discharged from the cylinder to be varied. I provide a reciprocable timing bar 15 and trip dogs 16, adjustably carried thereby, for operating the above control mechanism 14. The timing bar 15 is reciprocated from the table actuating means so that the bar operates in synchronism with the table. Thus as the table swings through an arc of any predetermined length, the mechanism 14 is operated from the timing bar to cause the next change in the cycle to occur. The timing bar 15 is slidably mounted in brackets 17, for carrying the panel of the feed control mechanism 14, and is provided with rack teeth which mesh with a gear 18 on a spindle 19. The latter is driven by bevel gears 20 from a cross shaft 21 which is driven by bevel gearing 22 from the vertical shaft 10.

The work 23 may be carried by any suitable fixture 24, which may be secured by any suitable means to the table 6. The fixture may have a dove-tailed connection with the table or the latter may have one or more T slots for receiving T headed bolts to secure the fixture to the table. The dove-tail on the table or the slots may extend radially from the pivot 7 or they may extend in a non-radial direction. In any case the work is adjustable relative to the pivot 7 to cut any desired radius within the usable limits of the working area of the table. A graduated scale may be provided for use by the operator in setting up the work. A plurality of surfaces of the work are preferably cut simultaneously by milling cutters 25, 26 and 27. The vertical cutter 25 may be arranged at any suitable angle relative to the surface of the table to cut an arcuate surface at a corresponding angle relative to the base of the work. Such surfaces may be concave or convex. The cutter 25 is carried by a cutter head 28 which is slidable on one side of the overarm 5 and is provided with a manually operable screw 51 for adjusting the cutter relative to the axis of the table 6. The cutter is driven by any suitable means from a splined shaft 29.

The horizontal cutters 26 and 27 are preferably parallel to one another and to the surface of the table 6 and are vertically spaced apart to cut the upper and lower sides of the work. These cutters are carried by a cutter head 30 which is slidable on the other side of the overarm 5. A manually operable screw 52 moves the cutter head 30 longitudinally of the overarm to adjust the cutters 26, 27 relative to the axis of the table. To permit the cutters 26, 27 to be adjusted relative to one another to take up wear and to suit work of different thicknesses, the lower cutter 27 is carried on a vertically adjustable slide 31 mounted on the cutter head 30. The cutters 26, 27 are driven by worm wheels 32, 33 which mesh with worms 34, 35 on a shaft 36 which is driven by bevel gears 37 from a sleeve 38 splined on a shaft 39. The sleeve slides along the shaft 39 as the cutter head 30 is moved along the overarm 5. When the slide 31 is moved relative to the cutter head 30, the worm wheel 33 rolls along its worm 35 whereby the cutter 27 may be driven in any desired position relative to the other cutter 26.

The splined shafts 29 and 39 are driven by any suitable means from an electric motor 40.

The pair or set of cutters 26, 27 are at one side of the cutter head 30 and are carried by spindles 53, 54 to which are secured the worm wheels 32, 33. The spindles also extend through the other side of the cutter head for carrying another pair or set of cutters 26a, 27a. With this arrangement the cutters 26, 27 will be used simultaneously with the cutter 25 to mill a convex surface A and the upper and lower sides B and C of the work 23. The other set of cutters 26a, 27a will be used simultaneously with the cutter 25 to mill a concave surface D and the upper and lower sides E and F of the work 23a. This arrangement of the two sets of horizontal cutters provides clearance for the cutter heads which may thus be positioned at the side of the work remote from the fixture used to secure the work to the table.

In practice, the table 6 is advanced rapidly from its loading position until the work reaches a point close to the cutters; the speed of the table is then reduced to the desired cutting speed until the work has moved past the cutters; the cutters are then stopped and the table is brought to a stop for a predetermined short period of time to ensure the cutters have stopped; thereafter the table is returned rapidly to its loading position.

The hereinbefore mentioned automatic feed control mechanism 14 is well known in the art and includes a plunger 41 which when manually operated by a lever 42 establishes communication between a supply pipe 43 and a pipe 48 leading to one end of the cylinder 12. At the same time the plunger establishes communication between a pipe 49 connected with the other end of the cylinder and a drain pipe 44. The latter leads to a tank 45 from which it is pumped to the supply pipe 43 by means of a suitably driven pump 50.

Since the timing bar 15 is reciprocated in synchronism with the turning table 6 as hereinbefore described, the trip dog 16, when the work reaches the predetermined point near the cutters, engages the plunger 41 and depresses it a predetermined distance whereby the rate of discharge from the cylinder is restricted so that the rate of feed is reduced. The restricted flow is manually adjustable so that the table will be rotated at the desired cutting speed. After the work has been moved past the cutters, a trip dog 16a on the bar 15 engages and opens a "limit" switch 46 carried by the frame of the machine. A trip dog 16b also on the bar 15 simultaneously actuates the plunger 41 to stop the flow of fluid to the cylinder 12 and thus stop the further feed movement of the table 6. The opening of the "limit" switch simultaneously causes, first, the circuit leading to the motor 40 to be broken to stop the cutters 25, 26 and 27; and second, causes a well known pneumatic electric timing device to be energized, which device, after a predetermined dwell to ensure the cutters have come to a dead stop causes a solenoid 47 to be energized. The solenoid is connected with the plunger 41 and is adapted, when energized, to move the plunger to establish communication between the supply pipe 43 and the pipe 49 and between the drain pipe 44 and the pipe 48 which causes the travel of the piston to be reversed at a rapid speed whereby the table will be returned to its initial position at a high rate of speed while the cutters are stopped. The direction of travel of the timing bar 15 is thus also reversed and as it nears its initial position, a "lift up" dog 16c engages the plunger and raises it into its "stop" position thus completing the cycle and stopping all further movements of the table until the lever 42 is again manually operated. The motor 40 is manually started by a "start" push button 55 and may be manually stopped by a "stop" button 56.

It will be understood that various modifications may be made without departing from the spirit of my invention. For example, grinding wheels may be substituted for the milling cutters or the machine may be a shaper instead of a milling machine in which case the cutters would not be rotated.

It is obvious that various arrangements of cutters may be used to machine various kinds of work. For instance, to machine the faces G, H, I, J and K of the work 23b in Figures 8 and 9, three vertical cutters 25a, 25c and 25d are used. The two cutters for the outside faces G and K are carried by two heads 30a, 30b which are independently movable, by separate manually operable screws 52a, 52b, along one side of the overarm 5. The screw 52a has a threaded connection with the head 30a and passes freely through an opening in the head 30b. The other screw 52b has a threaded connection with the other head 30b and passes freely through an opening in the head 30a so that either or both heads may be moved along the overarm to suit work of different widths. The cutter 25a for machining the surfaces H, I and J is carried by the hereinbefore described head 28 which is movable along the other side of the overarm 5.

In Figure 10, the work 23c has its faces L and M machined by the cutters 25b and 26b. The axis of the "vertical" cutter 25b is positioned at an angle to the vertical and the axis of the "horizontal" cutter 26b is at an angle to the horizontal.

What I claim as my invention is:

1. A machine of the class described having a frame including an overarm; a movable table suitably mounted on the frame for carrying work; a cutter head movable longitudinally on the overarm; a rotary cutter horizontally journalled on said head; a slide vertically adjustable on said head; a rotary cutter horizontally journalled on said slide below the first cutter for movement relative thereto; a suitably driven horizontal splined shaft; a vertical shaft journalled in said head having a slidable drive connection with the splined shaft; and worm gearing between each of the cutters and the vertical shaft for driving the cutters and permitting relative movement thereof.

2. A machine of the class described having a frame including an overarm; a movable table suitably mounted on the frame for carrying work; a cutter head movable longitudinally on the overarm; a rotary cutter horizontally journalled on said head; a slide vertically adjustable on said head; a rotary cutter horizontally journalled on said slide below the first cutter for movement relative thereto; a suitably driven horizontal shaft; a sleeve splined on said shaft and journalled in said cutter head to move therewith; a bevel gear secured to the sleeve; a vertical shaft journalled in said head; a bevel gear secured to the vertical shaft and meshed with the first bevel gear; and worm gearing between each of the cutters and the vertical shaft for driving the cutters and permitting relative movement thereof.

3. A machine of the class described having an overarm; a movable table suitably mounted on the machine for carrying work; a vertical cutter for machining concave and convex surfaces on the work; two sets of horizontal cutters, the sets of cutters being spaced apart horizontally and the cutters of each set being adjustable vertically to vary the distance between the cutters of each set; a cutter head for carrying the vertical cutter movable longitudinally on one side of the overarm; a second cutter head for carrying the two sets of horizontal cutters movable longitudinally on the other side of the overarm, the said cutter heads being independently movable longitudinally of the machine relative to the table and past one another so that the vertical cutter may be used simultaneously with one set of horizontal cutters to machine a concave surface and upper and lower sides of the work, and be used simultaneously with the other set of horizontal cutters to machine a convex surface and upper and lower sides of work.

4. A machine of the class described having an overarm; a table mounted on the machine for carrying work, said table being oscillable beneath the overarm to carry the work in an arcuate path; a vertical cutter for machining concave and convex surfaces on the work; a cutter head for carrying said cutter, said cutter head being slidably mounted on one side of the overarm; a set of horizontal cutters mounted at opposite ends of a common shaft; a second cutter head for carrying the set of horizontal cutters, said second cutter head being slidably mounted on the other side of the overarm; said cutter heads being independently movable across the path of the work and past one another so that the vertical cutter may be used simultaneously with one of the horizontal cutters to machine a concave surface and a side of the work, and may also be used simultaneously with the other horizontal cutter to machine a convex surface and a side of the work.

EDGAR BARKER.

REFERENCES CITED

The following references are of record in the file of this patent:

UNITED STATES PATENTS

| Number | Name | Date |
|---|---|---|
| 765,447 | Van Norman | July 19, 1904 |
| 1,492,640 | LaDucer | May 6, 1924 |
| 1,873,375 | Forward et al. | Aug. 23, 1932 |
| 2,081,288 | Armitage | May 25, 1937 |
| 2,379,870 | Barker | July 10, 1945 |